United States Patent
Kim

(10) Patent No.: US 9,258,509 B2
(45) Date of Patent: Feb. 9, 2016

(54) BROADCAST RECEIVING APPARATUS, METHOD OF CONTROLLING THE SAME, USER TERMINAL DEVICE, AND METHOD OF PROVIDING SCREEN THEREOF

(71) Applicant: SAMSUNG ELECTRONICS CO., LTD., Suwon-si (KR)

(72) Inventor: Hyo-dae Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 8 days.

(21) Appl. No.: 14/057,041

(22) Filed: Oct. 18, 2013

(65) Prior Publication Data

US 2014/0111699 A1    Apr. 24, 2014

(30) Foreign Application Priority Data

Oct. 18, 2012    (KR) .................... 10-2012-0116140

(51) Int. Cl.
| | | |
|---|---|---|
| H04N 21/422 | (2011.01) | |
| H04N 21/431 | (2011.01) | |
| H04N 21/4725 | (2011.01) | |
| H04N 21/81 | (2011.01) | |
| H04N 5/44 | (2011.01) | |
| H04L 12/28 | (2006.01) | |
| H04N 21/41 | (2011.01) | |
| H04N 21/4363 | (2011.01) | |
| H04N 21/4402 | (2011.01) | |
| H04N 21/4722 | (2011.01) | |
| H04N 21/475 | (2011.01) | |

(52) U.S. Cl.
CPC .......... *H04N 5/4403* (2013.01); *H04L 12/2814* (2013.01); *H04N 21/4126* (2013.01); *H04N 21/4222* (2013.01); *H04N 21/4312* (2013.01); *H04N 21/43637* (2013.01); *H04N 21/440272* (2013.01); *H04N 21/475* (2013.01); *H04N 21/4722* (2013.01)

(58) Field of Classification Search
None
See application file for complete search history.

(56) References Cited

U.S. PATENT DOCUMENTS

| | | | |
|---|---|---|---|
| 2005/0280742 A1* | 12/2005 | Jaffe | H04N 21/426 348/726 |
| 2007/0091180 A1* | 4/2007 | Han | G06F 3/04842 348/207.99 |
| 2008/0170806 A1* | 7/2008 | Kim | G06T 7/0075 382/285 |
| 2009/0113470 A1* | 4/2009 | Jo | H04N 21/4135 725/32 |

(Continued)

FOREIGN PATENT DOCUMENTS

KR    10-2012-0030644 A    3/2012

*Primary Examiner* — Brian T Pendleton
*Assistant Examiner* — Jean D Saint Cyr
(74) *Attorney, Agent, or Firm* — Sughrue Mion, PLLC

(57) ABSTRACT

A broadcast receiving apparatus includes a receiving unit which receives a broadcast signal, a graphic user interface (GUI) generating unit which generates a GUI, a signal processing unit which generates a video frame to which the GUI is added, a display unit which displays the video frame to which the GUI is added, a communication unit which establishes a communication connection with a user terminal device that executes a smart view function, and a control unit which controls the broadcast receiving apparatus to perform a corresponding operation according to a touch coordinate value transmitted from the user terminal device. Thus, the broadcast receiving apparatus can be controlled in various forms through the user terminal device.

12 Claims, 13 Drawing Sheets

(56) References Cited

U.S. PATENT DOCUMENTS

| | | | | |
|---|---|---|---|---|
| 2009/0315979 A1* | 12/2009 | Jung | .................. | H04N 13/0029 348/43 |
| 2011/0167447 A1 | 7/2011 | Wong | | |
| 2011/0267291 A1 | 11/2011 | Choi et al. | | |
| 2012/0167126 A1 | 6/2012 | Paek et al. | | |
| 2012/0240175 A1 | 9/2012 | Ohmori et al. | | |

* cited by examiner

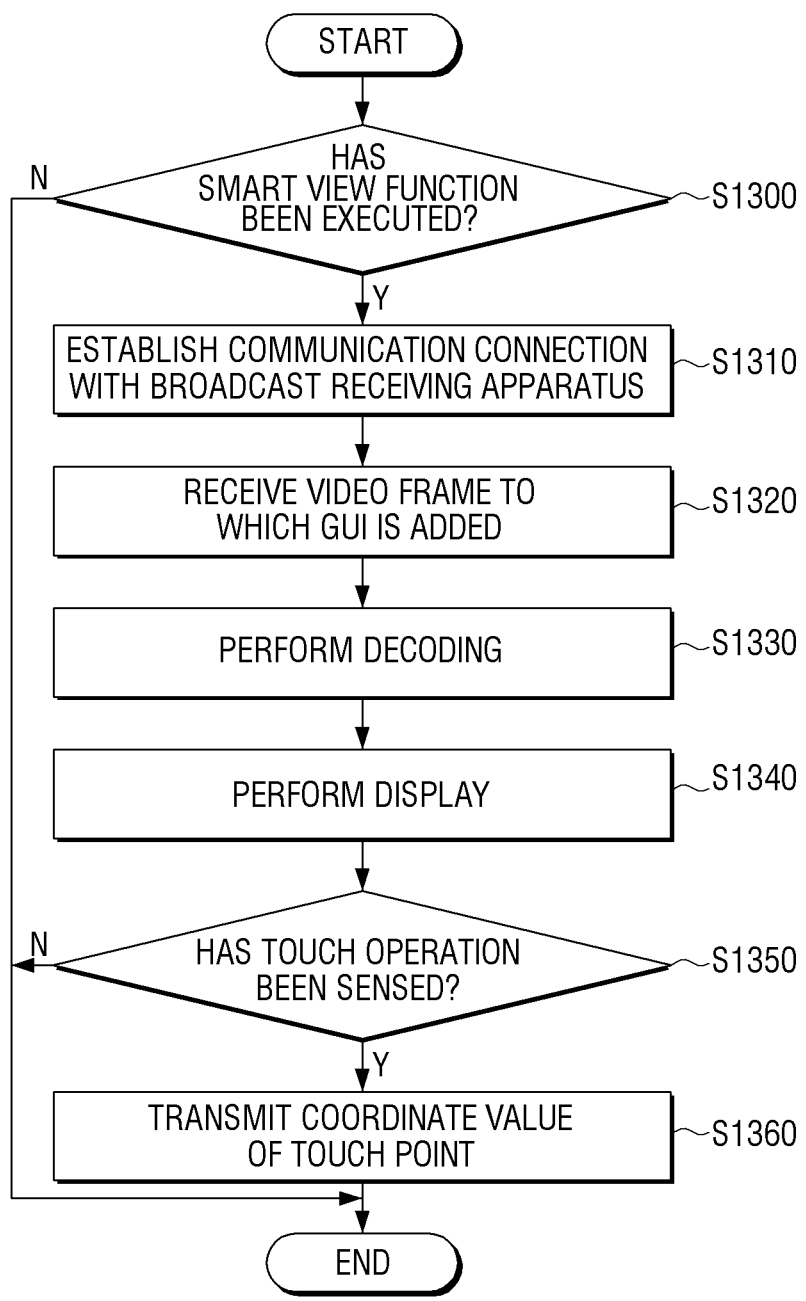

BROADCAST RECEIVING APPARATUS, METHOD OF CONTROLLING THE SAME, USER TERMINAL DEVICE, AND METHOD OF PROVIDING SCREEN THEREOF

CROSS-REFERENCE TO RELATED APPLICATION

This application claims priority from Korean Patent Application No. 10-2012-116140, filed on Oct. 18, 2012, in the Korean Intellectual Property Office, the disclosure of which is incorporated herein by reference in its entirety.

BACKGROUND

1. Field

Apparatuses and methods consistent with exemplary embodiments relate to a broadcast receiving apparatus, a method of controlling the same, a user terminal device, and a method of providing a screen thereof, and more particularly, to a method of controlling a broadcast receiving apparatus through a user terminal device by establishing a communication connection between the broadcast receiving apparatus and the user terminal device, the broadcast receiving apparatus, and the user terminal device.

2. Description of the Related Art

Under the influence of the development of electronic technology, various electronic devices have been developed and become widespread. In particular, recently, the use of electronic devices having enhanced performance such as a smart phone and a smart television (TV) has rapidly increased.

The needs of users for further various functions have also increased with an increase in the use of electronic devices having the increased performance. Thus, the efforts of manufacturers to satisfy the needs of the users are increasing and hence products with new functions not existing in the related art are appearing one after another.

On the other hand, with the development of communication technology, various electronic devices can be independently used according to a function of each device and connected to a wired/wireless network so that the electronic devices are mutually controlled. In particular, a broadcast receiving apparatus such as a TV and a user terminal device such as a portable phone are mutually connected through a wireless/wired link, and hence a user can perform an operation of controlling the TV or the like while watching a TV broadcast through the portable phone.

Further various functions of conveniently controlling the broadcast receiving apparatus are required according to an increase in the use of the above-described aspects of the exemplary embodiments. In addition, there is a need for a method of conveniently and efficiently controlling the broadcast receiving apparatus through a small screen because a size of the user terminal device is relatively smaller than that of the broadcast receiving apparatus.

SUMMARY

Exemplary embodiments overcome the above disadvantages and other disadvantages not described above. Also, the present invention is not required to overcome the disadvantages described above, and an exemplary embodiment may not overcome any of the problems described above.

Aspects of the exemplary embodiments relate to an apparatus which directly controls a GUI of the apparatus or a terminal device according to a user's operation, a controlling method thereof, a terminal device, and a method of providing a screen thereof.

According to one exemplary embodiment, an apparatus includes a receiver configured to receive a signal, a graphic user interface (GUI) generator configured to generate a GUI, a signal processor configured to generate a video frame by processing the signal and add the GUI to the generated video frame, a display unit which displays the video frame to which the GUI is added, a communicator configured to transmit the video frame to which the GUI is added to a terminal device that executes a function by establishing a communication connection with the terminal device, and a controller configured to determine whether the GUI has been selected according to a touch coordinate value when the video frame is touched on the terminal device and the touch coordinate value is transmitted and performs an operation corresponding to a determination result.

Herein, the signal processor may include a demodulator configured to demodulate the signal received by the receiver, a demultiplexer configured to detect video data by demultiplexing the demodulated signal, a video decoder configured to decode the video data, a first scaler configured to generate the video frame by scaling the decoded video data, a multiplexer configured to multiplex the GUI generated by the GUI generating unit into the video frame and provide the display unit with the video frame into which the GUI is multiplexed, a second scaler configured to scale the video frame into which the GUI is multiplexed by the multiplexer in correspondence with characteristics of the terminal device, and an encoder configured to encode the video frame scaled by the second scaling unit and provides the communicator with the encoded video frame.

Also, the GUI generator may include a first GUI generator configured to generate a first GUI to be displayed on the apparatus, and a second GUI generator configured to generate a second GUI to be provided to the terminal device, the signal processor may comprise a demodulator configured to demodulate the signal received by the receiver, a demultiplexer configured to detect video data by demultiplexing the demodulated signal, a video decoder configured to decode the video data, a first scaler configured to generate an output video frame by scaling the decoded video data, a first multiplexer configured to multiplex the first GUI into the output video frame and provides the display unit with the output video frame into which the first GUI is multiplexed, a second scaler configured to generate a transmission video frame by scaling the decoded video data in correspondence with characteristics of the terminal device, a second multiplexer configured to multiplex the second GUI into the transmission video frame, and an encoder configured to encode the transmission video frame into which the second GUI is multiplexed and provides the communicator with the encoded transmission video frame into which the second GUI is multiplexed, and the first GUI and the second GUI may be different in at least one of a layout, a size, a color, and a GUI item.

The GUI may include at least one from among a widget screen, an on-screen display (OSD) menu, an icon, and a graphic object.

According to one embodiment, a terminal device includes a storage which stores a program for executing a function, a communicator configured to establish a communication connection by searching for an apparatus when the program is executed, and receives a video frame to which a GUI is added from the apparatus, a decoder configured to decode the video frame to which the GUI is added, a display unit which displays the video frame to which the GUI is added, a sensor configured to sense a touch operation on the display unit, and a controller configured to transmit a coordinate value of a touch point to the apparatus when the touch operation is sensed and control an operation of the apparatus.

Herein, the control unit may display a first control menu for controlling the apparatus and a second control menu for controlling the terminal device on one screen when a type of touch operation is performed on the video frame.

Also, the controller may display at least one first control item for the apparatus when the first control menu is selected and transmits a first value to the apparatus when a user's setting on the at least one first control item is made, and the controller may display at least one second control item for the terminal device when the second control menu is selected and performs an operation corresponding to a second value when a user's setting on the at least one second control item is made.

Further, the controller may adjust a size of the video frame according to a command when the command for one from among enlarging and reducing the video frame to which the GUI is added is input, correct a coordinate value of a touch point by reflecting a scale factor of the video frame when a touch operation on the video frame with the adjusted size is sensed, and transmit the corrected coordinate value to the apparatus.

According to one embodiment, a method of controlling an apparatus includes receiving a signal, generating a video frame by processing the signal and adding a GUI to the generated video frame, displaying the video frame to which the GUI is added, transmitting the video frame to which the GUI is added to a terminal device that executes a function when a communication connection with the user terminal device is established, and determining whether the GUI has been selected according to a touch coordinate value when the video frame is touched on the terminal device and the touch coordinate value is transmitted, and performing an operation corresponding to a determination result.

Herein, the processing may include demodulating the received signal, detecting video data by demultiplexing the demodulated signal, decoding the video data, performing a first scaling process of generating the video frame by scaling the decoded video data, generating the GUI, multiplexing the GUI into the video frame, performing a second scaling process of scaling the video frame into which the GUI is multiplexed in correspondence with characteristics of the user terminal device, and encoding the video frame scaled in the second scaling process.

Also, the processing may include demodulating the received signal, detecting the video data by demultiplexing the demodulated signal, decoding the video data, generating an output video frame by scaling the decoded video data, generating a first GUI to be displayed on the apparatus, multiplexing the first GUI into the output video frame, generating a transmission video frame by scaling the decoded video data in correspondence with characteristics of the user terminal device, generating a second GUI to be provided to the user terminal device, multiplexing the second GUI into the transmission video frame, and encoding the transmission video frame into which the second GUI is multiplexed, wherein the first GUI and the second GUI may be different in at least one from among a layout, a size, a color, and a GUI item.

Herein, the GUI may include at least one from among a widget screen, an OSD menu, an icon, and a graphic object.

Meanwhile, a method of providing a screen of a terminal device includes establishing a communication connection by searching for an apparatus when a function is executed, receiving a video frame to which a GUI is added from the apparatus, decoding the video frame to which the GUI is added, displaying the video frame to which the GUI is added, sensing a touch operation on the video frame, and transmitting a coordinate value of a touch point to the apparatus when the touch operation is sensed and controlling an operation of the apparatus.

Herein, the method of providing a screen may further include displaying a first control menu for controlling the apparatus and a second control menu for controlling the terminal device on one screen when a type of touch operation is performed on the video frame.

Also, the method of providing a screen may further include displaying at least one first control item for the apparatus when the first control menu is selected, transmitting a first value to the apparatus when a user's setting on the first control item is made, displaying at least one second control item for the terminal device when the second control menu is selected, and performing an operation corresponding to a second value when a user's setting on the second control item is made.

Further, the method of providing a screen may further include adjusting a size of the video frame according to a command when the command for one from among enlarging and reducing the video frame to which the GUI is added is input, correcting a coordinate value of a touch point by reflecting a scale factor of the video frame when a touch operation on the video frame with the adjusted size is sensed, and transmitting the corrected coordinate value to the apparatus.

In accordance with various exemplary embodiments as described above, it is possible to control the apparatus in various forms through the terminal device. In particular, it is possible to directly control the apparatus through a GUI of the apparatus or selectively control the user terminal device itself according to the user's operation.

Additional and/or other aspects and advantages of the exemplary embodiments will be set forth in part in the description which follows and, in part, will be obvious from the description, or may be learned by practice of the exemplary embodiments.

BRIEF DESCRIPTION OF THE DRAWING FIGURES

The above and/or other aspects of the exemplary embodiments will be more apparent by describing certain exemplary embodiments with reference to the accompanying drawings, in which:

FIG. 13 is a flowchart illustrating a method of providing a screen of the user terminal device in accordance with an exemplary embodiment.

DETAILED DESCRIPTION OF THE EXEMPLARY EMBODIMENTS

Figure 1:
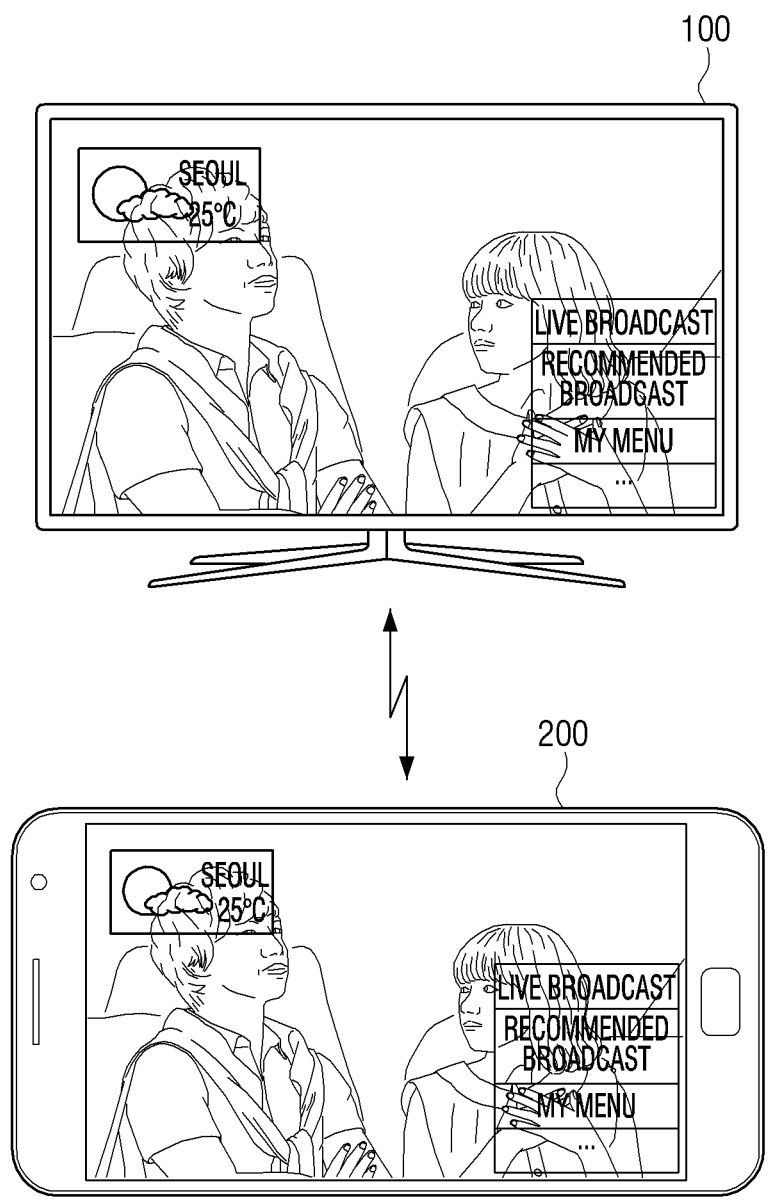
FIG. 1 is a diagram illustrating a communication connection being established between a broadcast receiving apparatus and a user terminal device and hence a smart view function is executed in accordance with an exemplary embodiment.

Certain exemplary embodiments will now be described in greater detail with reference to the accompanying drawings.

In the following description, same drawing reference numerals are used for the same elements even in different drawings. The matters defined in the description, such as detailed construction and elements, are provided to assist in a comprehensive understanding of the invention. Thus, it is apparent that the exemplary embodiments can be carried out without those specifically defined matters. Also, well-known functions or constructions are not described in detail since they would obscure the invention with unnecessary detail.

FIG. 1 is a diagram illustrating a communication connection being established between a broadcast receiving apparatus and a user terminal device and hence a smart view function is executed in accordance with an exemplary embodiment.

An example of the broadcast receiving apparatus 100 is any apparatus that is connectable to a network using a wired/wireless network and can receive and display a broadcast such as a smart TV or a notebook. An example of the user terminal device 200 is a smart phone or a tablet personal computer (PC) that is connectable to a network using a mobile communication network, a wireless local area network (WLAN) or the like and has a display unit for enabling an input to be generated by touching a screen.

On the other hand, the smart view function is a function in which a communication connection is established between the broadcast receiving apparatus 100 and the user terminal device 200 using home network technology, the broadcast receiving apparatus 100 transmits a video displayed on a screen to the user terminal device 200, and the user terminal device 200 receives the video and displays the received video on a screen, so that the user can also watch the video displayed on the broadcast receiving apparatus 100 using the user terminal device 200.

Referring to FIG. 1, the broadcast receiving apparatus 100 simultaneously displays a TV broadcast screen, a weather widget screen, and an on-screen display (OSD) menu on the screen. On the other hand, the smart view function is executed, and the weather widget screen and the TV broadcast screen including the OSD menu are simultaneously displayed on the user terminal device 200.

That is, the user terminal device 200 can receive a video frame of the broadcast receiving apparatus to which a GUI such as a widget screen or an OSD is added by establishing a communication connection with the broadcast receiving apparatus 100 through the smart view function, and display the video frame to which the GUI is added on the screen.

Hereinafter, an example of a TV screen to which a broadcast signal received by a receiving unit is demodulated will be described in an exemplary embodiment. Of course, any other screen capable of being displayed on the broadcast receiving apparatus can be displayed on the user terminal device in accordance with an exemplary embodiment. According to the smart view function of the user terminal device, the screen can be transmitted to the user terminal device and displayed on the user terminal device. For example, a screen in which a GUI is added to a video input through a Blu-ray disc player, a camcorder, a set-top box, or the like according to a function of the broadcast receiving apparatus can be displayed on a screen of the broadcast receiving apparatus or the user terminal device.

Figure 2:
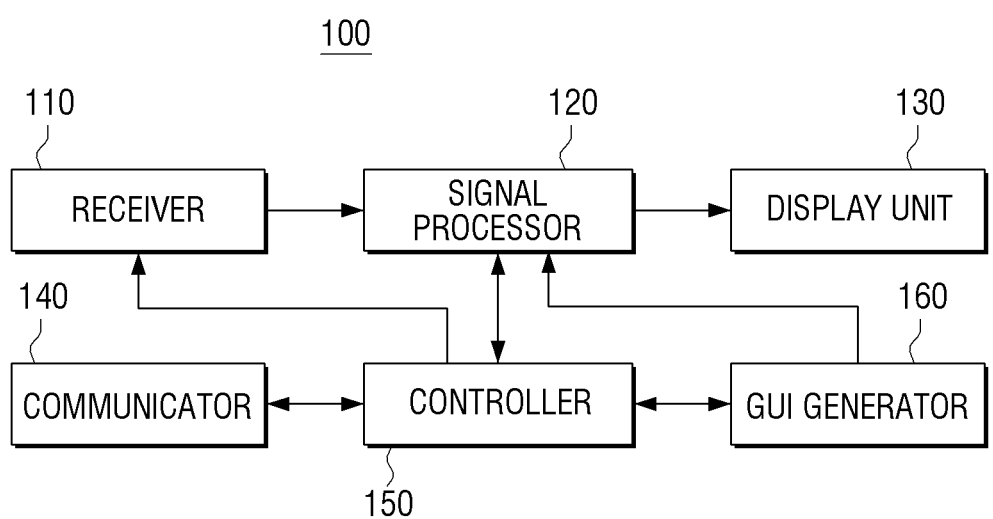
FIG. 2 is a block diagram of the broadcast receiving apparatus in accordance with an exemplary embodiment.

FIG. 2 is a block diagram of the broadcast receiving apparatus 100 in accordance with an exemplary embodiment. The broadcast receiving apparatus 100 includes a receiving unit (or a receiver) 110, a signal processing unit (or a signal processor) 120, a display unit 130, a communication unit (or a communicator) 140, a control unit (or a controller) 150, and a GUI generating unit (or a GUI generator) 160.

The receiving unit 110 receives a broadcast signal. Specifically, the receiving unit 110 can include an antenna configured to receive radio waves and a tuner configured to select a desired broadcast channel. When the broadcast signal is received through a cable, a set-top box, or the like, the receiving unit 110 can include only the tuner.

The GUI generating unit 160 generates a GUI. The GUI can be a widget screen, an OSD menu, an icon, a graphic object, or the like as a user interface introduced to represent a certain function and a purpose of use using a graphic element.

The signal processing unit 120 generates a video frame by processing a broadcast signal, and adds a GUI to the video frame. A detailed configuration of the signal processing unit 120 will be described later.

The display unit 130 displays the video frame to which the GUI is added. Although the display unit 130 can be implemented by a liquid crystal display (LCD) panel, organic light emitting diode (OLED), or the like, the present invention is not limited thereto.

The communication unit 140 establishes a communication connection with the user terminal device (denoted by reference numeral 200 in FIG. 1) that executes the smart view function, and transmits the video frame to which the GUI is added to the user terminal device 200. Although the communication unit 140 can communicate with the user terminal device 200 using home network technology such as a universal plug and play (UPnP) network protocol, a communication method is not limited thereto.

When a touch coordinate value of the user terminal device is transmitted, the control unit 150 controls the broadcast receiving apparatus 100 to perform a corresponding operation by determining whether the GUI has been selected according to the transmitted coordinate value.

That is, according to FIG. 2, when the receiving unit 110 receives a broadcast signal, the control unit 150 of the broadcast receiving apparatus 100 controls the signal processing unit 120 to process the received broadcast signal, generate a video frame, and add a GUI generated by the GUI generating unit 160 to the video frame. The control unit 150 controls the display unit 130 to display the video frame to which the GUI is added and simultaneously controls the communication unit 140 to transmit the video frame to which the GUI is added to the user terminal device, which executes the smart view function.

On the other hand, when the video frame to which the GUI is added is touched on the user terminal device that executes the smart view function, and a touch coordinate value is transmitted, the control unit 150 determines whether the GUI has been selected according to the coordinate value and controls the broadcast receiving apparatus 100 to perform a corresponding operation according to the determination result.

For this, when a coordinate point of (X, Y) is touched on the user terminal device (denoted by reference numeral 200 in FIG. 1) and its coordinate value is transmitted, the control unit 150 of the broadcast receiving apparatus 100 can calculate a coordinate value, for example, (X', Y'), of the display unit 130 of the broadcast receiving apparatus 100 corresponding to the coordinate value (X, Y) according to a coordinate system, determine whether the GUI of the broadcast receiving apparatus 100 has been selected, and control the broadcast receiving apparatus 100 to perform an operation corresponding to the selection of the GUI when it is determined that the GUI has been selected.

Specifically, the control unit 150 of the broadcast receiving apparatus 100 can receive information regarding the resolution of a screen of the user terminal device along with the touch coordinate value (X, Y) from the user terminal device 200 so as to calculate the coordinate value (X', Y'), and calculate the coordinate value (X', Y') based on the touch coordinate value (X, Y) and the information.

In addition, the control unit 150 can receive a coordinate value (X'', Y'') after conversion using a coordinate value of a specific resolution from the user terminal device 200, and calculate the coordinate value (X', Y') based on the received coordinate value (X'', Y''). Here, the specific resolution can be the resolution of the video frame to which the GUI is added transmitted by the broadcast receiving apparatus 100 to the user terminal device 200.

However, a method in which the control unit 150 of the broadcast receiving apparatus 100 determines whether the GUI has been selected according to the coordinate value transmitted from the user terminal device is not limited to the above.

Figure 3:
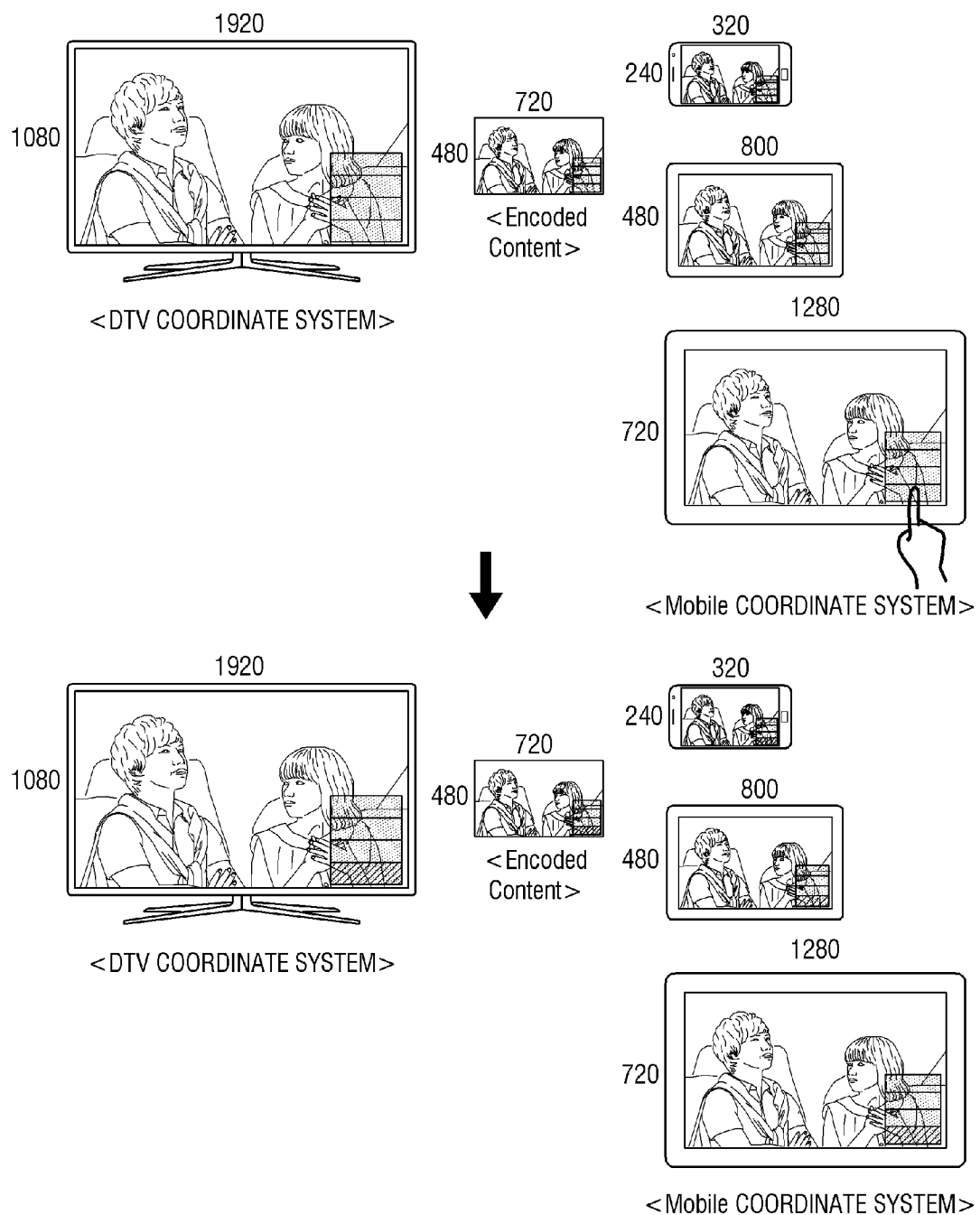
FIG. 3 is a diagram in which the smart view function is executed and a TV graphic user interface (GUI) is directly operated in the user terminal device in accordance with an exemplary embodiment.

FIG. 3 is a diagram illustrating an operation between the broadcast receiving apparatus and the user terminal device in which the smart view function is executed in accordance with an exemplary embodiment.

An example of the broadcast receiving apparatus 100 is an apparatus of a digital TV (DTV) coordinate system having a resolution of 1920×1080, and encoded content having a resolution of 720×480 refers to a video frame encoded by an encoding unit (denoted by reference numeral 127 in FIGS. 4 and 5) of the broadcast receiving apparatus 100 for transmission to the user terminal device. Mobile devices of various resolutions in mobile coordinate systems refer to user terminal devices 200 having display units of various sizes.

FIG. 3 illustrates a state in which the mobile device is connected to the DTV when the smart view function is executed. According to the example of FIG. 3, the DTV displays a video frame to which a GUI is added at a resolution of 1920×1080 and simultaneously encodes the video frame to which the GUI is added at a resolution of 720×480 to transmit the encoded video frame to which the GUI is added to the mobile device. Then, the mobile device calculates a DTV coordinate system, an encoded content coordinate system, and a mobile coordinate system, and displays a DTV screen transmitted to be suitable for its own resolution.

In this case, when a mobile device user touches a GUI part of a received video, the mobile device transmits a touch coordinate value to the DTV. In addition, the DTV performs a calculation based on the received touch coordinate value, performs an operation corresponding to the calculation result, and transmits an updated GUI to the mobile device while displaying the updated GUI.

Specifically, for example, when the user touches a bottom field of the TV GUI displayed on the mobile device, the mobile device can transmit information regarding a coordinate value corresponding to a touch point and its own resolution to the DTV. Then, the DTV can calculate a touch coordinate value corresponding to the DTV screen using the information regarding the touch coordinate value and the resolution of the mobile device screen transmitted from the mobile device, and then determine whether the TV GUI corresponding to its coordinates has been selected.

However, a method in which the DTV calculates a coordinate value corresponding to the DTV from a coordinate value transmitted from the mobile device and determines whether a TV GUI has been selected is not limited to the above.

Thus, the DTV can determine and display that the bottom field of the GUI has been selected, and transmit an updated GUI to the mobile device. The mobile device receiving the updated GUI displays a video frame to which the updated GUI is added.

Figure 4:
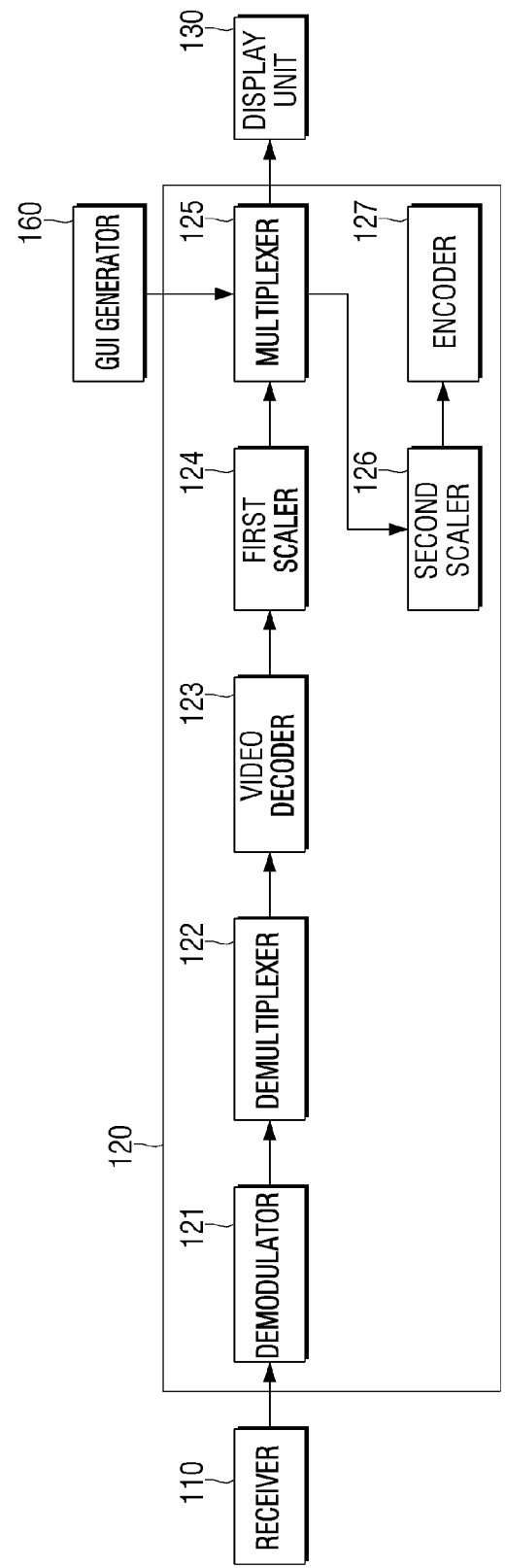
FIG. 4 is a diagram illustrating a specific configuration of the broadcast receiving apparatus in accordance with an exemplary embodiment.

On the other hand, FIG. 4 is a diagram illustrating a specific configuration of the broadcast receiving apparatus in accordance with an exemplary embodiment. According to FIG. 4, the signal processing unit 120 of the broadcast receiving apparatus 100 includes a demodulating unit (or a demodulator) 121, a demultiplexing unit (or a demultiplexer) 122, a video decoding unit (or a video decoder) 123 a first scaling unit (or a first scaler) 124, a multiplexing unit (or a multiplexer) 125, a second scaling unit (or a second scaler) 126, and an encoding unit (or an encoder) 127.

When a broadcast signal is received by the receiving unit 110 of the broadcast receiving apparatus 100, the demodulating unit 121 demodulates the received broadcast signal. The demultiplexing unit 122 demultiplexes the broadcast signal demodulated by the demodulating unit 121 and detects video data. The video decoding unit 123 decodes the video data detected by the demultiplexing unit, and the first scaling unit 124 generates a video frame by scaling the video data.

On the other hand, the multiplexing unit 125 multiplexes a GUI generated by the GUI generating unit 160 into the video frame generated by the first scaling unit 124, and provides the video frame into which the GUI is multiplexed simultaneously to the display unit and the second scaling unit 126.

The display unit 130 displays the video frame to which the GUI is added received from the multiplexing unit. The second scaling unit 126 scales the video frame into which the GUI is multiplexed in correspondence with characteristics of the user terminal device, and provides the scaled video frame into which the GUI is multiplexed to the encoding unit 127. The encoding unit 127 encodes the scaled video frame into which the GUI is multiplexed and provides the communication unit 140 with the encoded scaled video frame into which the GUI is multiplexed.

Accordingly, because the broadcast receiving apparatus 100 can transmit the video frame to which the GUI is added to the user terminal device 200 using the above-described configuration of FIG. 4, the user can directly control the GUI of the broadcast receiving apparatus while viewing a broadcast screen through the user terminal device.

Figure 5:
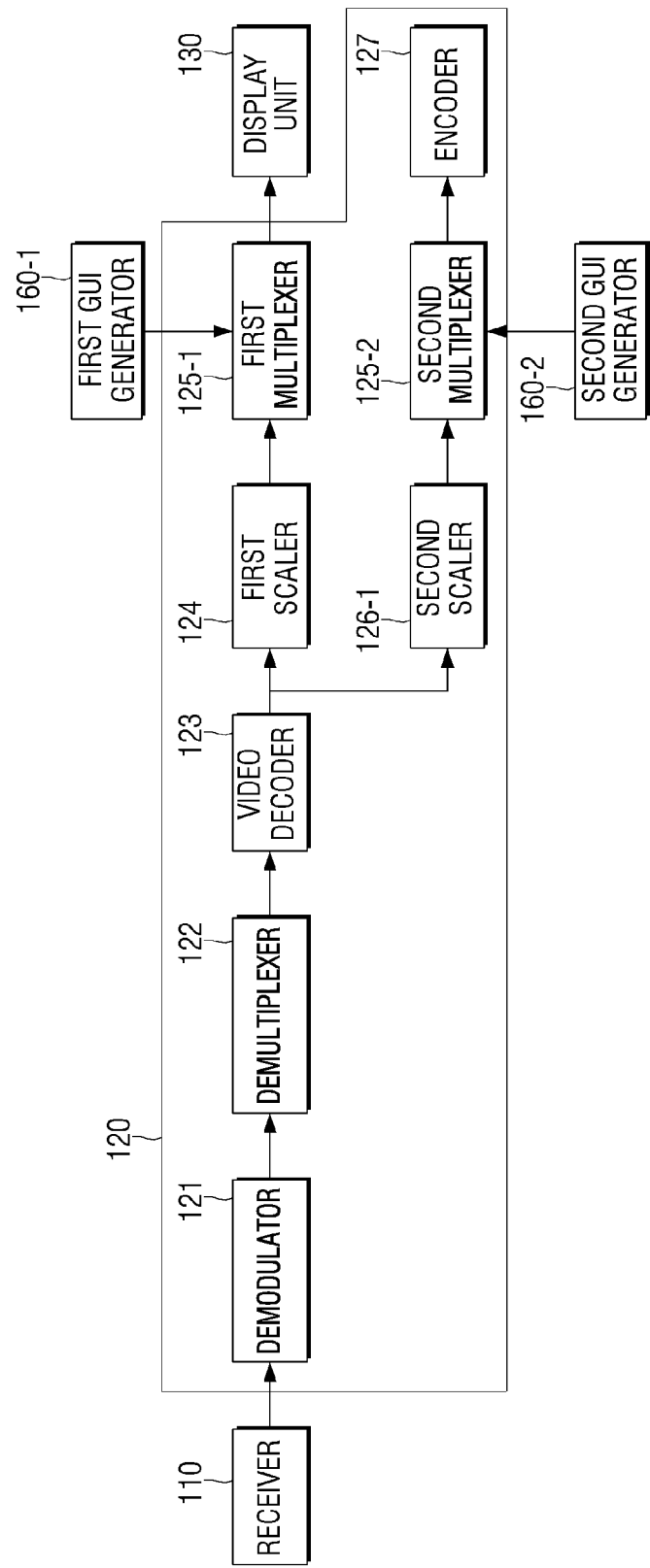
FIG. 5 is a diagram illustrating a specific configuration of the broadcast receiving apparatus including a second GUI generating unit for the user terminal device in accordance with an exemplary embodiment.
Figure 6:
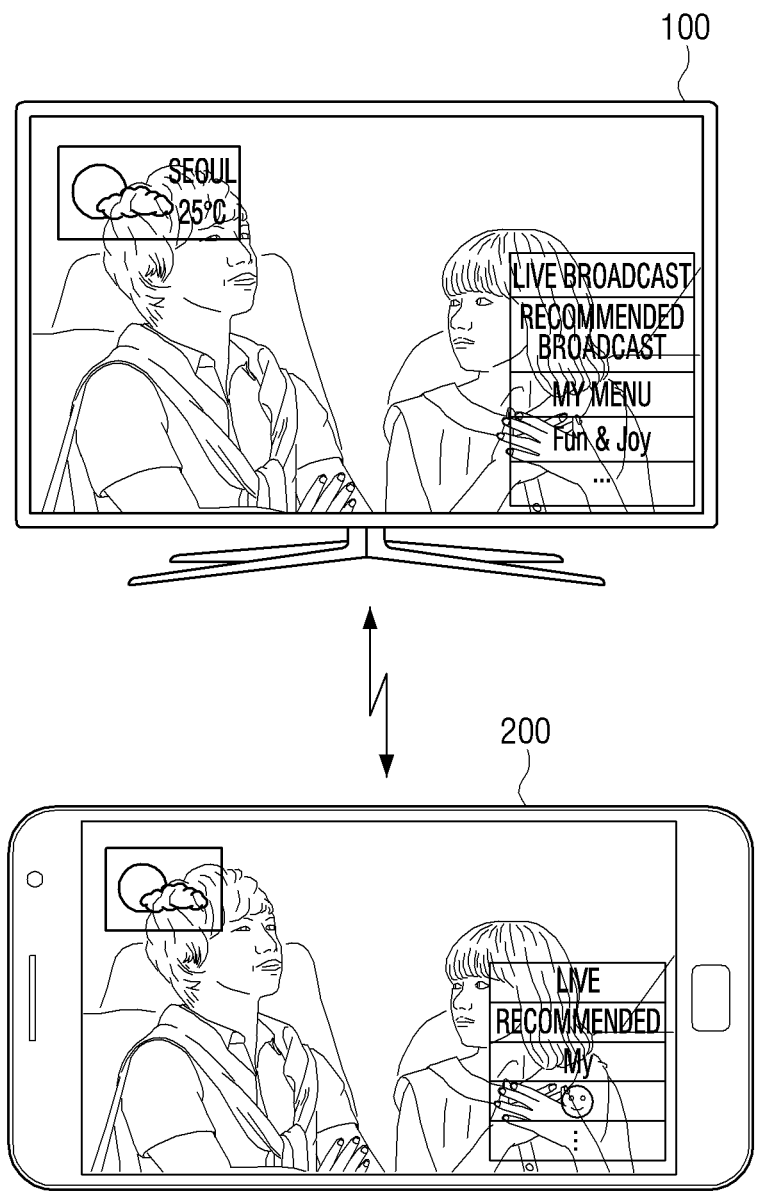
FIG. 6 is a diagram illustrating an example of a screen displayed on the broadcast receiving apparatus according to FIG. 5 and the user terminal device.

FIG. 5 is a diagram illustrating a specific configuration of the broadcast receiving apparatus in accordance with another exemplary embodiment, and FIG. 6 is a diagram illustrating the user terminal device executing the smart view function using the broadcast receiving apparatus according to FIG. 5.

FIG. 5 illustrates a configuration in which a GUI generating unit for the broadcast receiving apparatus and a GUI generating unit for the user terminal device are separately provided. As compared to the configuration of FIG. 4, there is a difference that the GUI generating unit is divided into a first GUI generating unit and a second GUI generating unit, and the multiplexing unit is divided into a first multiplexing unit and a second multiplexing unit. Only the difference of FIG. 5 compared to FIG. 4 will be described here.

According to FIG. 5, the first GUI generating unit generates a first GUI to be displayed on the broadcast receiving apparatus 100, and the second GUI generating unit generates a second GUI to be displayed on the user terminal device 200. A first multiplexing unit (or A first multiplexer) 125-1 multiplexes a video frame generated by the first scaling unit 124 with the first GUI, and displays the video frame multiplexed with the first GUI on a screen through the display unit 130.

In addition, the second scaling unit generates a transmission video frame by scaling video data decoded by the video decoding unit (or the video decoder) 123 in correspondence with characteristics of the user terminal device, and sends the generated transmission video frame to the second multiplexing unit. When the second multiplexing unit multiplexes the second GUI into the transmission video frame and provides the encoding unit (or the encoder) 127 with the transmission video frame into which the second GUI is multiplexed, the encoding unit 127 encodes the transmission video frame into which the second GUI is multiplexed and provides the communication unit (or the communicator) 140 with the encoded transmission video frame into which the second GUI is multiplexed.

On the other hand, although not illustrated in FIGS. 4 and 5, the demultiplexing unit can demultiplex a demodulated broadcast signal to detect audio data, and provide the detected audio data to a separate audio output unit, which can provide the user with a sound.

An exemplary embodiment using the above-described configuration of FIG. 5 is illustrated in FIG. 6.

From FIG. 6, it can be seen that a weather widget screen and a menu displayed on the broadcast receiving apparatus 100 are different from a weather widget screen and a menu illustrated on the user terminal device 200. This is an effect due to the configuration in which the GUI generating unit and the multiplexing unit are separately provided for the broadcast receiving apparatus and the user terminal device as described above with reference to FIG. 5.

Accordingly, it is possible to effectively overcome a disadvantage that a screen size of the user terminal device is relatively smaller than that of the broadcast receiving apparatus by representing a GUI with the same content in a different layout, size, item, or color using the above-described configuration.

Specifically, from the example of FIG. 6, it can be seen that only a graphic for enabling weather is intuitively recognized and displayed on the widget screen of the user terminal device 200, which is different from the weather widget screen of the broadcast receiving apparatus 100, and a menu OSD screen of the broadcast receiving apparatus 100 is also represented using an abbreviation or icon, which occupies a small space, on the user terminal device 200.

Figure 7:
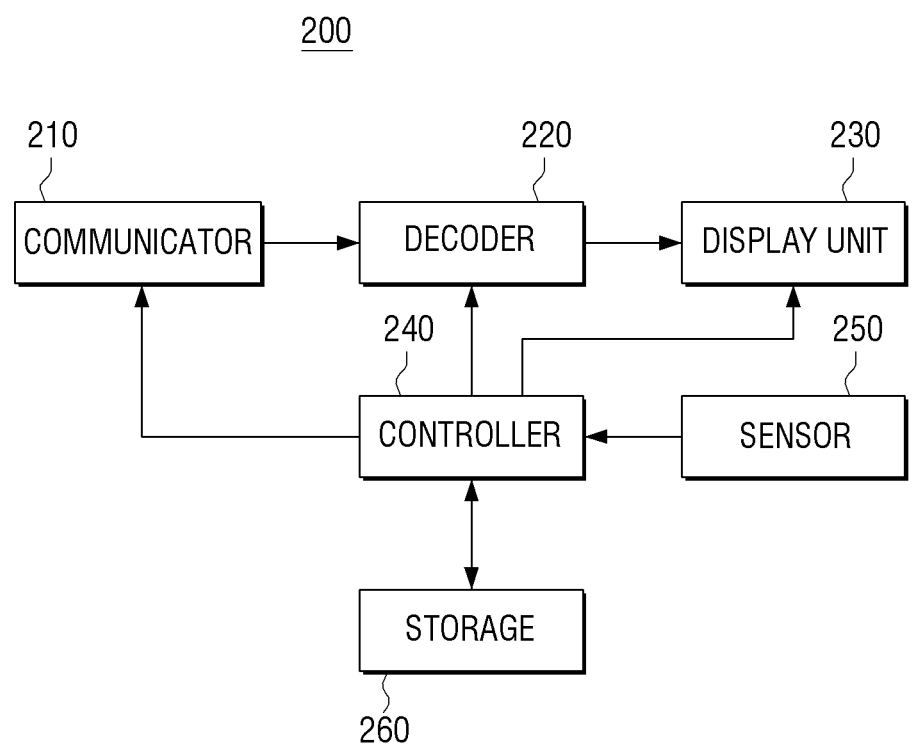
FIG. 7 is a block diagram of the user terminal device in accordance with an exemplary embodiment.

On the other hand, FIG. 7 is a block diagram illustrating a configuration of the user terminal device in accordance with an exemplary embodiment. According to FIG. 7, the user terminal device 200 includes a communication unit (or communicator) 210, a decoding unit (or a decoder) 220, a display unit 230, a control unit (or a controller) 240, a sensing unit (or a sensor) 250, and a storage unit (or a storage) 260.

The storage unit 260 stores a program for executing the smart view function. Here, the smart view function is a function of enabling the user terminal device 200 to receive and display a screen displayed on the broadcast receiving apparatus 100. Because this function has been described above with reference to FIG. 1, specific redundant description thereof is omitted here.

For this, the storage unit 260 can be implemented by a memory card, a read only memory (ROM), or the like.

The communication unit 210 communicates with the broadcast receiving apparatus 100. Specifically, when the program for executing the smart view function is executed, the communication unit 210 establishes a communication connection by searching for the external broadcast receiving apparatus 100. For example, the communication unit 210 can search for an external device communicable with the user terminal device 200 using home network technology such as a UPnP network protocol, and communicate with the searched broadcast receiving apparatus 100.

In addition, the communication unit 210 can receive a video frame to which a GUI is added from the broadcast receiving apparatus 100. Here, the video frame to which the GUI is added can be a video frame displayed on the broadcast receiving apparatus 100. For example, when a broadcast video frame and an icon corresponding to an application installed in the broadcast receiving apparatus 100 overlap and are displayed on the broadcast receiving apparatus 100, the communication unit 210 can receive the broadcast video frame overlapping the icon from the broadcast receiving apparatus 100.

The decoding unit 220 decodes the video frame to which the GUI is added. Also, the decoding unit 220 can perform signal processing on the video frame to which the GUI is added such that the video frame to which the GUI is added can be output from the display unit 230 by performing various image processing such as scaling, noise filtering, frame rate conversion, and resolution conversion.

In particular, the decoding unit 220 can perform adjustment to the resolution of a video frame suitable for the display unit 230. Here, the video frame may be a video frame to which a GUI is added. For example, it is assumed that the resolution of the video frame capable of being displayed by the display unit 230 is a resolution of 320×240. In this case, when a video frame with a resolution of 720×480 is received from the broadcast receiving apparatus 100, the decoding unit 220 can convert the resolution of the video frame received from the broadcast receiving apparatus 100 into 320×240, and deliver the video frame with the resolution of 320×240 to the display unit 230.

The display unit 230 displays various screens. Here, the screen can include an image, a moving image, a webpage, and the like. In addition, the display unit 230 can display a video frame to which a GUI is added. In this case, the video frame to which the GUI is added can be received from the broadcast receiving apparatus 100.

For this, the display unit 230 can be implemented by an LCD, OLED, or the like.

On the other hand, the display unit 230 can be implemented in a touch screen forming a mutual layer structure with a touch pad. In this case, the display unit 230 can receive an input of a touch operation from the user in addition to a function as an output apparatus that displays a screen.

The sensing unit 250 senses a touch operation on the display unit 230. Specifically, the sensing unit 250 can sense a position, an area, and pressure of a touch on the display unit 230, and deliver the sensing result to the control unit 240. For this, the sensing unit 250 can be implemented by a resistive or capacitive touch sensor or the like.

The control unit 240 controls the overall operation of the user terminal device 200. Specifically, when a user command for executing the smart view function is input, the control unit 240 can execute the program for executing the smart view function stored in the storage unit 260.

When the smart view function is executed, the control unit 240 establishes a communication connection with the broadcast receiving apparatus 100, and controls the communication unit 210 to receive a video frame to which a GUI is added. In addition, the control unit 240 can control the decoding unit 220 to perform signal processing such as decoding, scaling, and resolution conversion on the video frame to which the GUI is added and display the video frame to which the GUI is added after the signal processing on the display unit 230.

In addition, when a touch operation on the display unit 230 is sensed, the control unit 240 can transmit a coordinate value of a touch point to the broadcast receiving apparatus 100 and control an operation of the broadcast receiving apparatus 100.

Specifically, assuming that the resolution of a video frame capable of being displayed by the display unit 230 of the user terminal device 200 is a resolution of 320×240 and an encoded video frame with a resolution of 720×480 has been received from the broadcast receiving apparatus 100, the control unit 240 can control the user terminal device 200 to transmit a coordinate value of a touch point and information (320×240) regarding the resolution of the display unit 230 to the broadcast receiving apparatus 100 if a touch operation on the display unit 230 is input in a state in which a video frame to which a GUI is added is displayed at the resolution of 320×240.

In addition, the control unit 240 can control the user terminal device 200 to provide the broadcast receiving apparatus 100 with a coordinate value obtained by converting the coordinate value of the touch point of a screen with the resolution of 320×240 in correspondence with the resolution (720×480) of the video frame received from the broadcast receiving apparatus 100.

Figure 8:
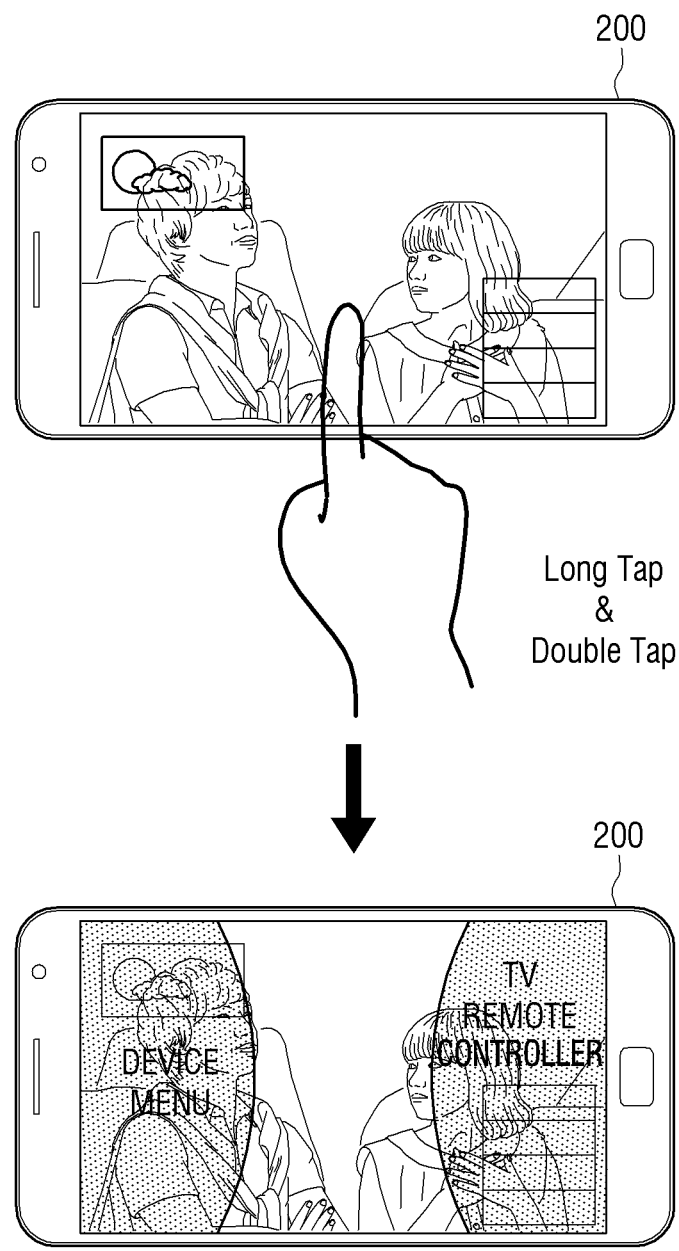
FIG. 8 is a diagram illustrating a first control menu (TV remote controller) and a second control menu (device menu) being displayed according to a preset type of touch operation by a user in accordance with an exemplary embodiment.
Figure 9:
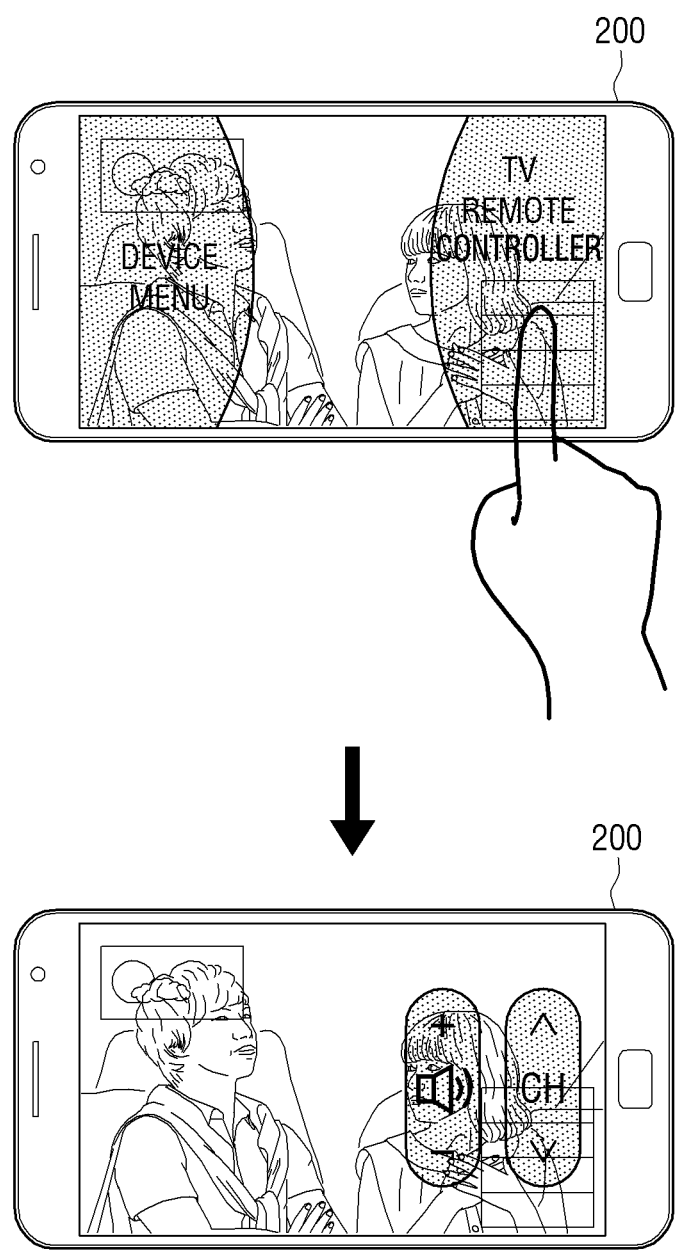
FIG. 9 is a diagram illustrating an operation when the user selects the first control menu in accordance with an exemplary embodiment.
Figure 10:
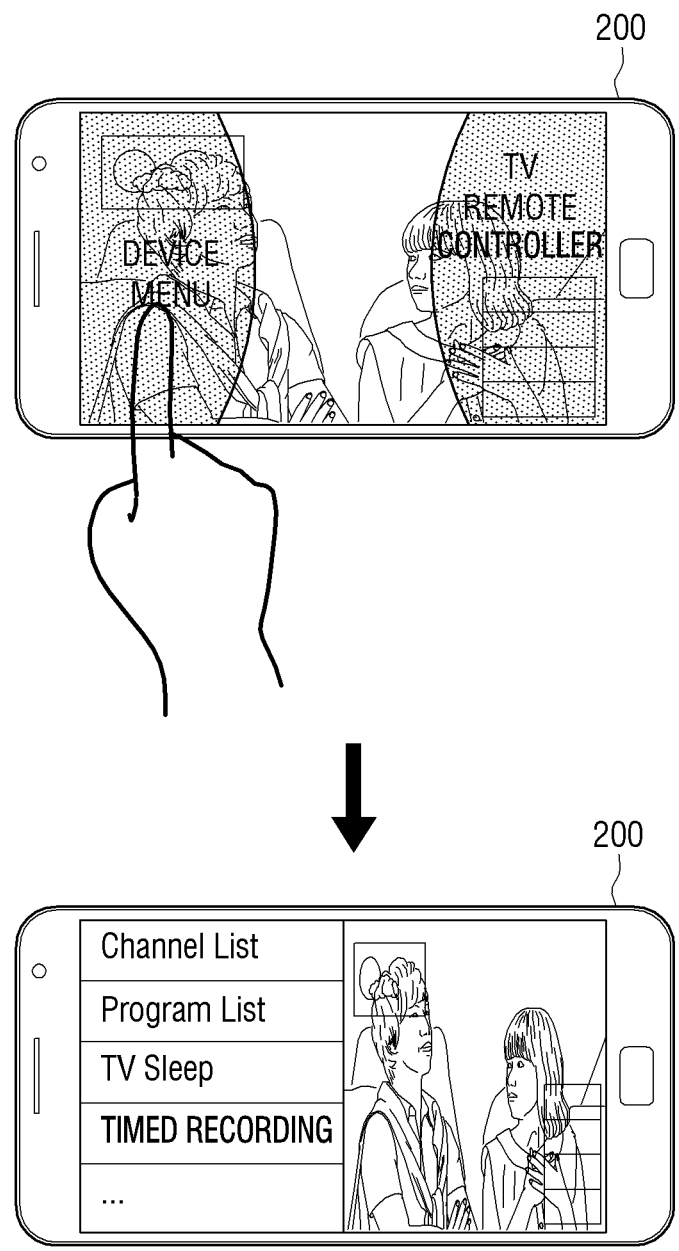
FIG. 10 is a diagram illustrating an operation when the user selects the second control menu in accordance with an exemplary embodiment.

FIGS. 8 to 10 are diagrams illustrating control of the user terminal device 200 when an event for use in the user terminal device 200 has been generated while the smart view function is executed.

According to FIG. 8, if an event used by the user in the user terminal device, that is, a preset type of touch operation such as a long tap or a double tap, is generated when the smart view function is executed and the user terminal device 200 receives a video frame to which a GUI is added from the broadcast receiving apparatus 100 and displays the received video frame to which the GUI is added, the control unit 240 of the user terminal device 200 displays a first control menu for controlling the broadcast receiving apparatus 100 such as a TV remote controller and a second control menu for controlling the user terminal device 200 such as a device menu on one screen.

FIG. 9 is a diagram illustrating the case in which the user has selected the first control menu, and FIG. 10 is a diagram illustrating the case in which the user has selected the second control menu.

According to FIG. 9, when the user has selected the TV remote controller, the control unit 240 of the user terminal device 200 displays control items relating to volume and a channel change so as to control the broadcast receiving apparatus 100. When the user makes a setting relating to the volume or the channel change, the control unit 240 controls the communication unit 210 of the user terminal device 200 to transmit a set value to the broadcast receiving apparatus 100.

According to FIG. 10, when the user has selected the device menu, the control unit 240 of the user terminal device 200 displays items such as a channel list, a program list, TV Sleep, and timed recording to be provided for use in the user terminal device 200, and controls the user terminal device 200 to perform an operation corresponding to a user-set value when the user makes a setting on the item.

According to the above-described examples of FIGS. 8, 9, and 10, it is possible to ensure high usability because both UI control of the broadcast receiving apparatus and UI control of the user terminal device can be performed according to the user's selection. On the other hand, as described in the example of FIG. 6, the user terminal device has a smaller screen size than the broadcast receiving apparatus. Accordingly, the usability for the user may be limited. Another exemplary embodiment for overcoming the limited usability may be a method illustrated in FIG. 11.

Figure 11:
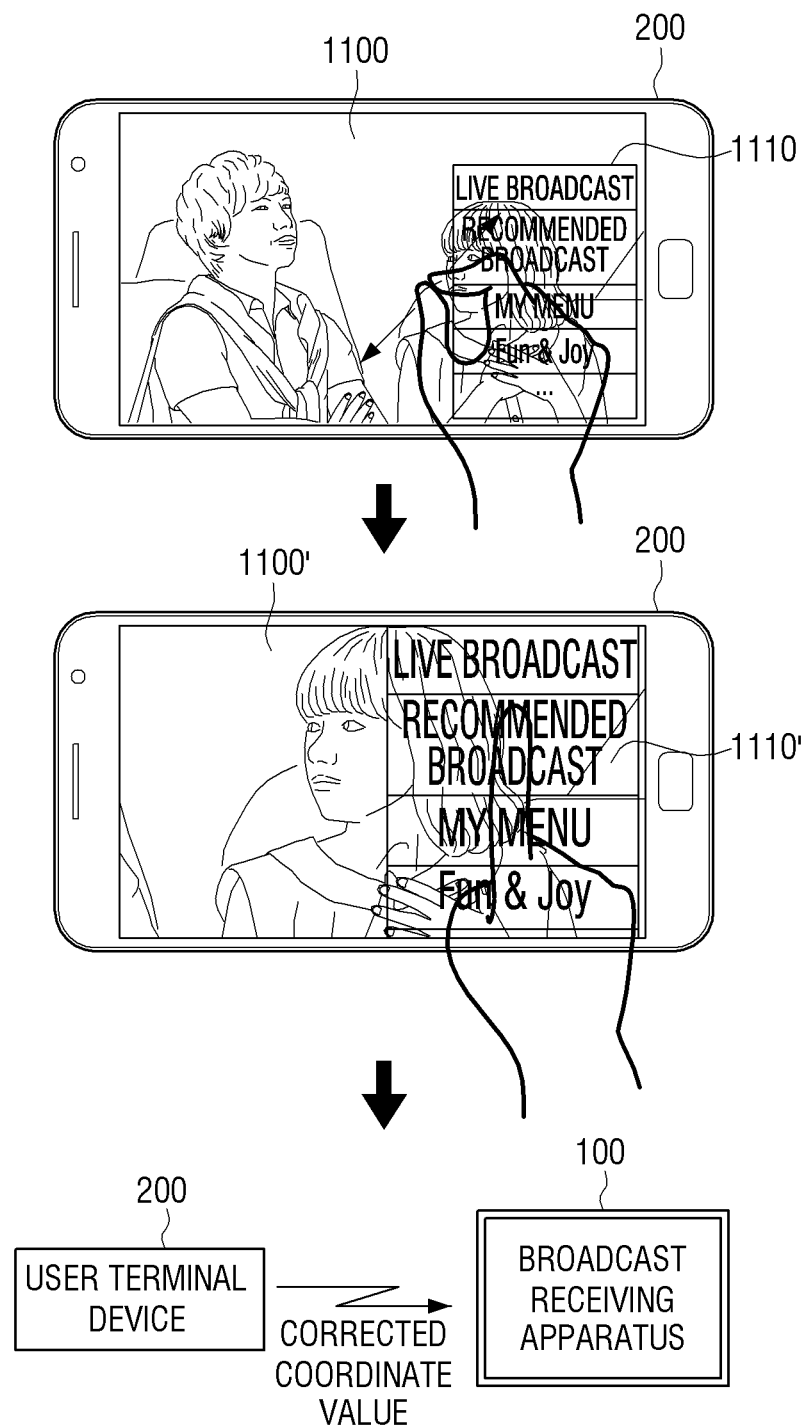
FIG. 11 is a diagram illustrating an operation of the user terminal device when an input is generated to enlarge a screen of the user terminal device in accordance with an exemplary embodiment.

According to FIG. 11, when the smart view function is executed and the user performs an operation for enlarging a video frame 1100 to which a GUI 1110 is added on a displayed screen of the user terminal device 200, a video frame 1100' to which a GUI 1110' is added is enlarged in size and displayed according to the user's operation.

Thereafter, when the user's touch operation on the enlarged video frame is sensed, the control unit 240 of the user terminal device 200 corrects a coordinate value of a touch point by reflecting a scale factor of the video frame, and transmits the corrected coordinate value to the broadcast receiving apparatus 100.

For this, for example, when a coordinate point of (X, Y) on the screen of the user terminal device 200 is changed to (X', Y') according to the user's enlargement operation and the user touches a point of (X', Y'), the control unit 240 can correct a touch coordinate value to (X, Y) by reflecting a scale factor of the video frame and transmit the corrected coordinate value (X, Y) to the broadcast receiving apparatus 100.

At this time, the control unit 240 can control the user terminal device 200 to perform an operation of transmitting information regarding the screen resolution of the user terminal device 200 or transmitting a value into which the corrected coordinate value (X, Y) has been converted in correspondence with the resolution of the video frame received from the broadcast receiving apparatus 100.

Only the case in which a video frame to which a GUI is added is enlarged has been illustrated in FIG. 11. Of course, reduction can also be performed according to the user's operation.

Thus, the user can control the broadcast receiving apparatus through the user terminal device by overcoming a disadvantage that a screen of the user terminal device is relatively smaller than that of the broadcast receiving apparatus.

Figure 12:
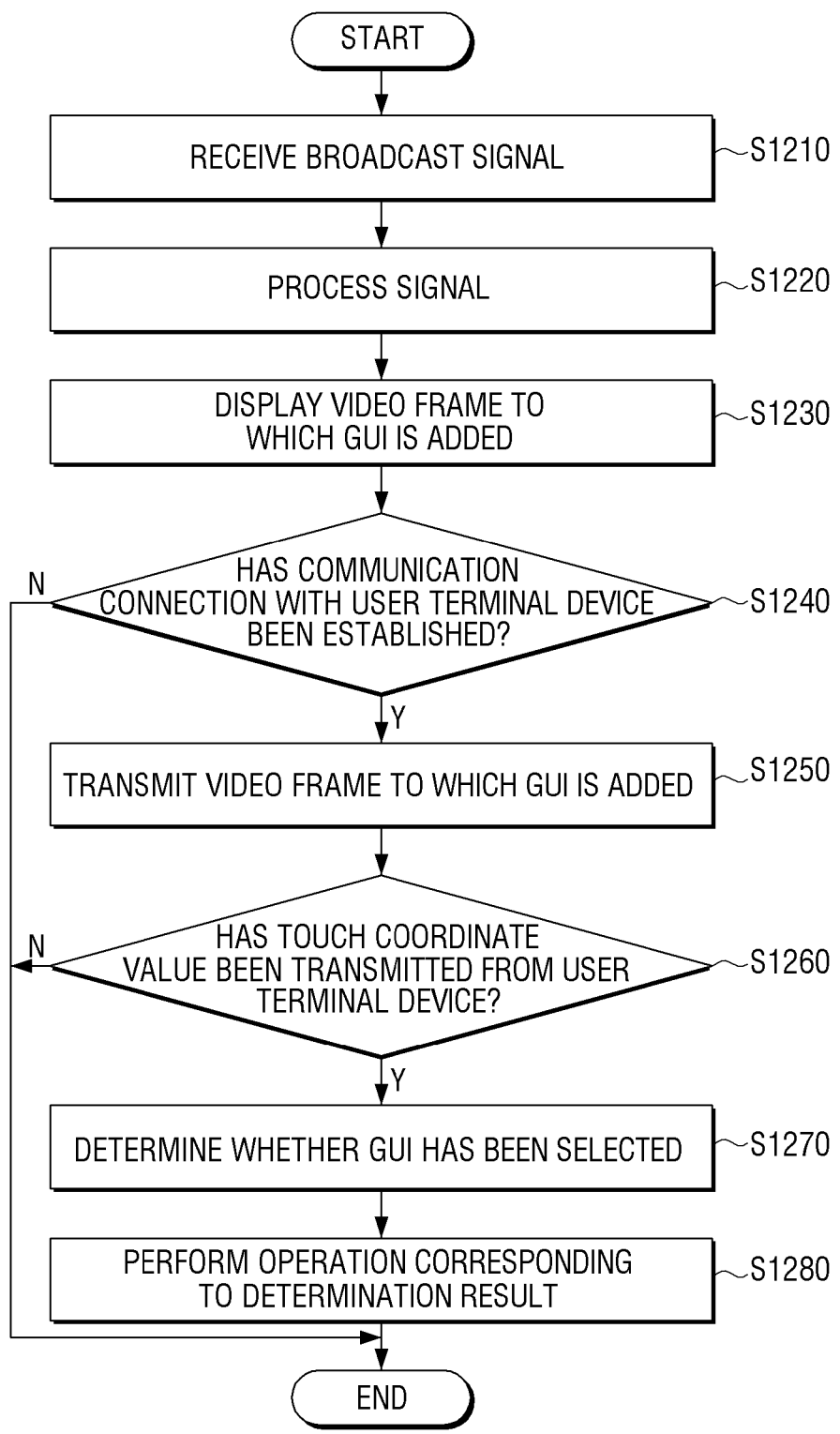
FIG. 12 is a flowchart illustrating a method of controlling the broadcast receiving apparatus in accordance with an exemplary embodiment.

FIG. 12 is a flowchart illustrating a method of controlling the broadcast receiving apparatus in accordance with an exemplary embodiment.

According to FIG. 12, when a broadcast signal is received (S1210), signal processing is performed to generate a video frame and add a GUI to the generated video frame (S1220), and the video frame to which the GUI is added is displayed (S1230).

In addition, when a communication connection with the user terminal device that executes the smart view function is established (Yes in S1240), the video frame to which the GUI is added is transmitted to the user terminal device (S1250).

Subsequently, when a touch coordinate value of the video frame is transmitted from the user terminal device (YES in S1260) it is determined whether the GUI has been selected according to the transmitted touch coordinate value (S1270), and an operation corresponding to the determination result is performed (S1280).

Here, in step S1220 of performing the signal processing, the received broadcast signal can be demodulated, the demodulated broadcast signal can be demultiplexed, and video data can be detected. Subsequently, a first scaling process of decoding the video data, scaling the decoded video data, and generating the video frame can be performed. In addition, a second scaling process of generating a GUI, multiplexing the generated GUI into a video frame, and scaling the video frame into which the GUI is multiplexed in correspondence with characteristics of the user terminal device can be performed. The video frame scaled in the second scaling process can be encoded.

In addition, in the signal processing step, an output video frame can be generated by demodulating the received broadcast signal, demultiplexing the demodulated broadcast signal, detecting video data, decoding the detected video data, and scaling the decoded video data. Subsequently, a first GUI to be displayed on the broadcast receiving apparatus can be generated, and the generated first GUI can be multiplexed into an output video frame. On the other hand, a transmission video frame can be generated by scaling the decoded video data in correspondence with the characteristics of the user terminal device, a second GUI to be provided to the user terminal device can be generated, and the generated second GUI can be multiplexed into the transmission video frame. Subsequently, the transmission video frame into which the second GUI is multiplexed can be encoded. Here, it is possible to control the broadcast receiving apparatus to generate the first GUI and the second GUI different in at least one of a layout, a size, a color, and a GUI item.

On the other hand, in the above-described method of controlling the broadcast receiving apparatus, the GUI can include at least one of a widget screen, an OSD menu, an icon, and a graphic object.

FIG. 13 is a flowchart illustrating a method of providing a screen of the user terminal device in accordance with an exemplary embodiment.

In the method of providing the screen of the user terminal device in accordance with the exemplary embodiment according to FIG. 13, when a smart view function is executed (YES in S1300) a communication connection is established by searching for an external broadcast receiving apparatus (S1310) and a video frame to which a GUI is added is received from the broadcast receiving apparatus (S1320). Subsequently, the video frame to which the GUI is added is decoded (S1330), and the video frame to which the GUI is added is displayed (S1340). On the other hand, when a touch operation on the video frame is sensed (YES in S1350), a coordinate value of a touch point is transmitted to the broadcast receiving apparatus (S1360) and hence an operation of the broadcast receiving apparatus can be controlled.

In addition, the screen providing method can further include the step of displaying a first control menu for controlling the broadcast receiving apparatus and a second control menu for controlling the user terminal device on one screen when a preset type of touch operation is performed on a video frame.

Here, when the first control menu is selected, at least one first control item for the broadcast receiving apparatus is displayed, and a user-set value is transmitted to the broadcast receiving apparatus when the user's setting for the first control item is made. On the other hand, when the second control menu is selected, at least one second control item for the user terminal device can be displayed, and an operation corresponding to a user-set value can be performed when the user's setting for the second control item is made.

In addition, in the screen providing method, a size of a video frame is adjusted according to a user command when the user command for enlarging or reducing the video frame to which the GUI is added is input. When a touch operation on the video frame with the adjusted size is sensed, a coordinate value of a touch point can be corrected by reflecting a scale factor of the video frame, and the corrected coordinate value can be transmitted to the broadcast receiving apparatus.

In accordance with various exemplary embodiments as described above, it is possible to control the broadcast receiving apparatus in various forms through the user terminal device. In particular, it is possible to directly control the broadcast receiving apparatus through a GUI of the broadcast receiving apparatus or selectively control the user terminal device itself according to the user's operation.

On the other hand, the method of controlling the broadcast receiving apparatus and the method of providing the screen of the user terminal device in accordance with the above-described various exemplary embodiments can be generated by software and implemented on the broadcast receiving apparatus and the user terminal device.

Specifically, in accordance with an exemplary embodiment, a non-transitory computer readable medium storing a program for performing the steps of receiving a broadcast signal; generating a video frame by processing the broadcast signal and adding a GUI to the generated video frame; displaying the video frame to which the GUI is added; transmitting the video frame to which the GUI is added to the user terminal device when a communication connection with the user terminal device that executes a smart view function is executed, is established; and determining whether the GUI has been selected according to a touch coordinate value when the video frame is touched on the user terminal device and the touch coordinate value is transmitted, and performing an operation corresponding to a determination result can be installed in the broadcast receiving apparatus.

The non-transitory computer-readable medium refers to a device readable medium that semi-permanently stores data rather than a medium that temporarily stores data such as a register, a cache, or a memory. Specifically, each of the above-described various programs stored in a non-transitory computer-readable medium such as a compact disc (CD), a digital versatile disc (DVD), a hard disk, a Blu-ray disc, a universal serial bus (USB), a memory card, or an ROM can be provided.

The foregoing exemplary embodiments and advantages are merely exemplary and are not to be construed as limiting the present invention. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. An apparatus comprising:
a receiver configured to receive a signal;
a graphic user interface (GUI) generator configured to generate a GUI;
a signal processor configured to generate a video frame by processing the signal and adds the GUI to the generated video frame;
a display unit which displays the video frame to which the GUI is added;
a communicator configured to transmit the video frame to which the GUI is added to a terminal device that executes a function by establishing a communication connection with the terminal device; and a controller configured to determine whether the GUI has been selected according to a touch coordinate value when the video frame is touched on the terminal device and the touch coordinate value is transmitted, and the controller performs an operation corresponding to a determination result.

2. The apparatus as claimed in claim 1, wherein the signal processor comprises:
a demodulator configured to demodulate the signal received by the receiver;
a demultiplexer configured to detect video data by demultiplexing the demodulated signal;
a video decoder configured to decode the video data;
a first scaler configured to generate the video frame by scaling the decoded video data;
a multiplexer configured to multiplex the GUI generated by the GUI generator into the video frame and provide the display unit with the video frame into which the GUI is multiplexed;
a second scaler configured to scale the video frame into which the GUI is multiplexed by the multiplexer in correspondence with characteristics of the terminal device; and
an encoder configured to encode the video frame scaled by the second scaler and provide the communicator with the encoded video frame.

3. The apparatus as claimed in claim 1,
wherein the GUI generator comprises:
a first GUI generator configured to generate a first GUI to be displayed on the apparatus; and
a second GUI generator configured to generate a second GUI to be provided to the user terminal device,
wherein the signal processor comprises:
a demodulator configured to demodulate the signal received by the receiver;
a demultiplexer configured to detect video data by demultiplexing the demodulated signal;
a video decoder configured to decode the video data;
a first scaler configured to generate an output video frame by scaling the decoded video data;
a first multiplexer configured to multiplex the first GUI into the output video frame and provide the display unit with the output video frame into which the first GUI is multiplexed;
a second scaler configured to generate a transmission video frame by scaling the decoded video data in correspondence with characteristics of the user terminal device;
a second multiplexer configured to multiplex the second GUI into the transmission video frame; and
an encoder configured to encode the transmission video frame into which the second GUI is multiplexed and provide the communicator with the encoded transmission video frame into which the second GUI is multiplexed,
wherein the first GUI and the second GUI are different in at least one from among a layout, a size, a color, and a GUI item.

4. The apparatus as claimed in claim 1, wherein the GUI includes at least one from among a widget screen, an on-screen display (OSD) menu, an icon, and a graphic object.

5. A method of controlling an apparatus, comprising:
receiving a signal;
generating a video frame by processing the signal and adding a GUI to the generated video frame;
displaying the video frame to which the GUI is added;
transmitting the video frame to which the GUI is added to a terminal device that executes a function when a communication connection with the user terminal device is established; and
determining whether the GUI has been selected according to a touch coordinate value when the video frame is touched on the terminal device and the touch coordinate value is transmitted, and performing an operation corresponding to a determination result.

6. The method as claimed in claim 5, wherein the processing comprises:
demodulating the received signal;
detecting video data by demultiplexing the demodulated signal;
decoding the video data;
performing a first scaling process of generating the video frame by scaling the decoded video data;
generating the GUI;
multiplexing the GUI into the video frame;
performing a second scaling process of scaling the video frame into which the GUI is multiplexed in correspondence with characteristics of the user terminal device; and
encoding the video frame scaled in the second scaling process.

7. The method as claimed in claim 5,
wherein the processing comprises:
demodulating the received signal;
detecting the video data by demultiplexing the demodulated signal;
decoding the video data;
generating an output video frame by scaling the decoded video data;
generating a first GUI to be displayed on the apparatus;
multiplexing the first GUI into the output video frame;
generating a transmission video frame by scaling the decoded video data in correspondence with characteristics of the user terminal device;
generating a second GUI to be provided to the user terminal device;
multiplexing the second GUI into the transmission video frame;
encoding the transmission video frame into which the second GUI is multiplexed, and
wherein the first GUI and the second GUI are different in at least one from among a layout, a size, a color, and a GUI item.

8. The method as claimed in claim 5, wherein the GUI includes at least one from among a widget screen, an OSD menu, an icon, and a graphic object.

9. The apparatus as claimed in claim 1, wherein the signal is a broadcast signal.

10. The method as claimed in claim 5, wherein the signal is a broadcast signal.

11. The method as claimed in claim 5, wherein the GUI comprises at least one from among a widget screen and an OSD menu and wherein the terminal device is a mobile terminal which controls at least one function of the apparatus via the GUI.

12. The method as claimed in claim 5, further comprising:
receiving, by the apparatus, from the terminal device, which is a mobile terminal, the touch coordinate value;
determining, by the apparatus, based on the received touch coordinate value, a corresponding coordinate value with respect to the displayed video frame with the added GUI; and in response to the determining indicating that the corresponding coordinate value represents an item in the GUI, executing the item to control a function of the apparatus.

* * * * *